N. D. SCOTT.
CHAIN COUPLING FOR CARS.
APPLICATION FILED FEB. 21, 1913.

1,132,625.

Patented Mar. 23, 1915.

WITNESSES
Howard D. Ott.
J. F. Riley.

N. D. Scott,
INVENTOR,
BY E. G. Siggers
ATTORNEY

UNITED STATES PATENT OFFICE.

NATHAN D. SCOTT, OF DESHLER, OHIO.

CHAIN COUPLING FOR CARS.

1,132,625.  Specification of Letters Patent.  Patented Mar. 23, 1915.

Application filed February 21, 1913. Serial No. 749,939.

*To all whom it may concern:*

Be it known that I, NATHAN D. SCOTT, a citizen of the United States, residing at Deshler, in the county of Henry and State of Ohio, have invented a new and useful Chain Coupling for Cars, of which the following is a specification.

The invention relates to improvements in chain couplings for cars.

The object of the present invention is to improve the construction of chain couplings for cars, and to provide a simple, efficient and comparatively inexpensive chain coupling of great strength and durability, designed in event of the pulling out of the draw bar or the breakage of the same to connect the disabled car with the draw head of another car, and adapted to be readily secured to the truck or other portion of the disabled car, and capable of affording a close connection and of thereby reducing to a minimum the danger of the breakage of the chain coupling.

A further object of the invention is to provide a chain coupling of this character adapted to be readily carried and easily handled, and equipped with means for repairing the chain, which is connected with the disabled car should such chain become broken.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

Figure 1:
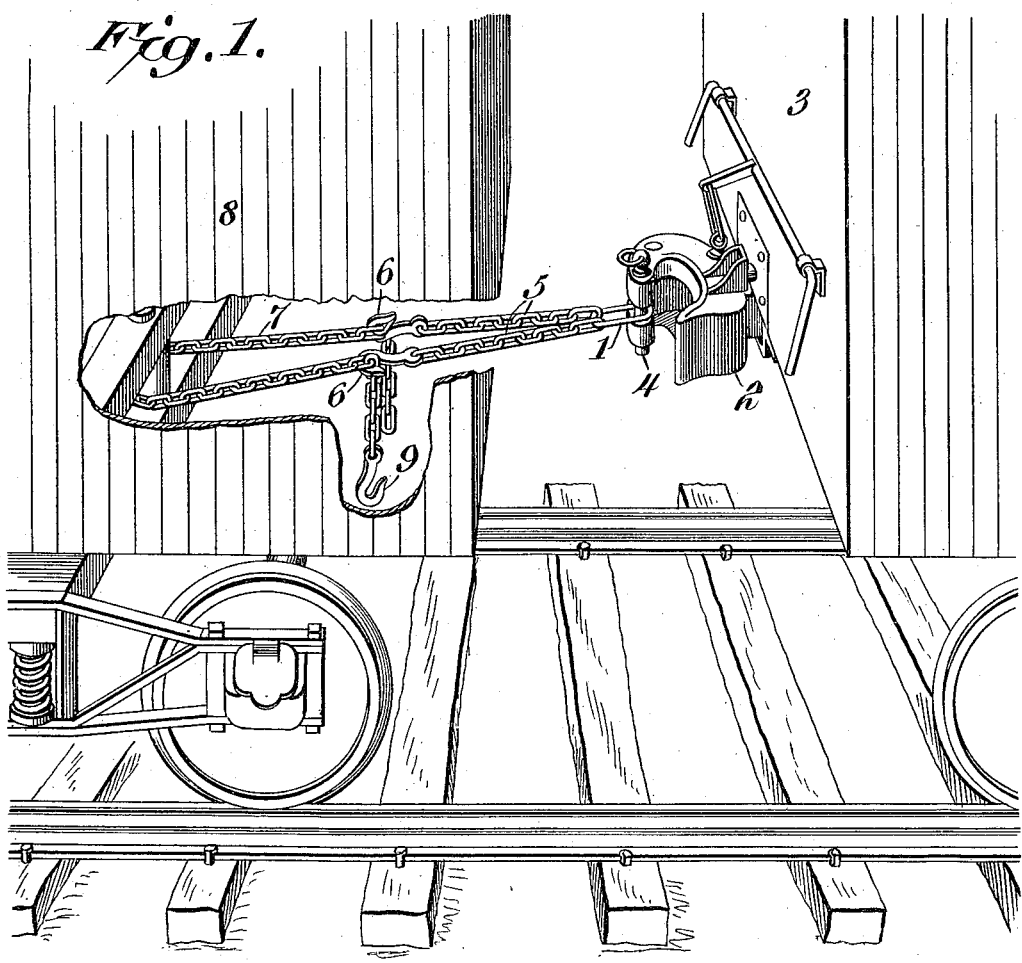
Figure 2:
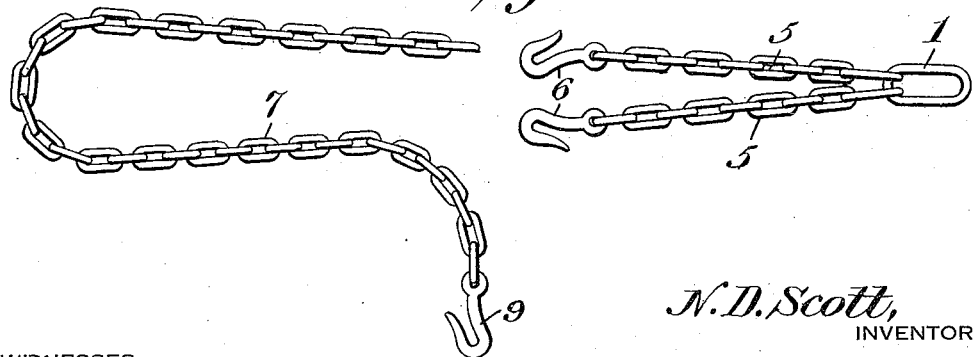

In the drawing: Figure 1 is a perspective view of a chain coupling, constructed in accordance with this invention, and shown applied to two cars. Fig. 2 is a plan view of the chain pipe coupling, the members thereof being separated.

Like numerals of reference designate corresponding parts in all the figures of the drawing.

In the accompanying drawing in which is illustrated the preferred embodiment of the invention, the chain coupling comprises two separate members or portions, adapted to be carried and handled separately, thereby obviating the labor and inconvenience of carrying the long exceedingly heavy chain and applying the same to the cars to be coupled. One of the members of the chain coupling comprises a coupling link 1 adapted to be secured in the draw head 2 of a car 3 by a coupling pin 4, and connected with two short chains 5, which are linked at one end into the coupling link 1 and equipped at the other end with hooks 6. The other member 7 of the coupling chain consists of a single continuous chain, adapted to be looped around the truck or other portion of a disabled car 8, as illustrated in Fig. 1 of the drawing, and its side portions, which extend outwardly in the direction of the car 3, are adapted to be engaged by the hooks 6. The hooks 6 have narrow openings between the bills and the shanks, and the links of the chains 7 are preferably arranged in planes at right angles to each other, so that when a link is placed edgewise in one of the hooks 6, the adjacent link will form a stop or abutment for engaging with such hook. The chains 7 may be of any preferred construction, and the hooks 6 may engage the links in any desired manner. By means of the hooks 6 of the relatively short chains 5 and the long chains 7 a disabled car may be coupled as tight and as closely as desired to another car, so that there will be no excessive slack, and the danger of the breakage of the chain is thereby reduced to a minimum.

In order to enable the relatively long chain 7 to be easily and quickly repaired in event of breakage, it is equipped at one end with a hook 9, adapted, should the chain 7 become broken, to be connected or engaged with the part broken off by placing one of the links thereof in the opening between the bill of the hook 9 and the shank of the same.

What is claimed is:—

A chain coupling comprising a coupling link adapted to be secured in the draw head of a car coupling, a pair of chains, each linked at one end into the coupling link and provided at the other end with a hook, said chains being relatively short so as to clear the track when in a hanging position, and a separate relatively long chain designed to be looped around a truck or other portion of a disabled car and adapted to have the sides of the loop separately engaged with the hooks of the short chain, whereby the cars may be coupled together as closely as desired with all of the slack eliminated from the chains and with a uniform strain on the short chains and both sides of the looped relatively long chain, said long and short chains being adapted to be handled and carried separately and the hooks of the short chains being both located adjacent to the ends of the connected cars at the space between the end trucks of the same to permit ready uncoupling of the cars, and a repair hook linked into one end of the long chain and constituting a permanent portion of the same and adapted in event of breakage of the long chain to engage with the broken portion to provide a quick repair without materially shortening such relatively long chain.

In testimony, that I claim the foregoing as my own, I have hereto affixed my signature in the presence of two witnesses.

NATHAN D. SCOTT.

Witnesses:
F. J. House,
J. M. Meyers.

Copies of this patent may be obtained for five cents each, by addressing the "Commissioner of Patents. Washington, D. C."